(12) United States Patent
Berlandier

(10) Patent No.: US 10,535,026 B2
(45) Date of Patent: *Jan. 14, 2020

(54) EXECUTING A SET OF BUSINESS RULES ON INCOMPLETE DATA

(71) Applicant: INTERNATIONAL BUSINESS MACHINES CORPORATION, Armonk, NY (US)

(72) Inventor: Pierre C. Berlandier, San Diego, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/401,378

(22) Filed: May 2, 2019

(65) Prior Publication Data

US 2019/0258980 A1 Aug. 22, 2019

Related U.S. Application Data

(63) Continuation of application No. 15/236,827, filed on Aug. 15, 2016.

(51) Int. Cl.
*G06Q 10/06* (2012.01)

(52) U.S. Cl.
CPC .............. *G06Q 10/06316* (2013.01)

(58) Field of Classification Search
CPC ............................................... G06Q 10/06316
USPC ....................................................... 705/7.26
See application file for complete search history.

(56) References Cited

U.S. PATENT DOCUMENTS

| 7,587,379 B2* | 9/2009 | Huelsman | G06Q 10/06 706/47 |
|---|---|---|---|
| 7,650,315 B2 | 1/2010 | Wiest | |
| 7,885,847 B2 | 2/2011 | Wodtke | |
| 8,001,070 B2* | 8/2011 | Zhang | G06N 5/025 706/47 |
| 8,515,883 B2 | 8/2013 | Junker | |

(Continued)

OTHER PUBLICATIONS

Chiang et al., "Discovering Data Quality Rules," PVLDB '08, Aug. 23-28, 2008, pp. 1166-1177, VLDB Endowment, ACM, Auckland, New Zealand.

(Continued)

*Primary Examiner* — Dylan C White
(74) *Attorney, Agent, or Firm* — Michael O'Keefe

(57) ABSTRACT

A method for executing a plurality of business rules on a plurality of incomplete data is provided. The method may include receiving the plurality of business rules, an object model, and a plurality of ruleset parameters. The method may also include generating a dependency tree based on the received plurality of business rules, the received object model, and the received plurality of ruleset parameters. The method may further include generating a plurality of ruleset source code based on a dependency tree that allows for disabling at least one of the received plurality of business rules. The method may also include determining a plurality of data corresponding to the presented set of data elements needed for evaluating the corresponding business rule is unavailable. The method may further include disabling the corresponding business rule based on determining the plurality of data is unavailable.

20 Claims, 8 Drawing Sheets

(56) References Cited

U.S. PATENT DOCUMENTS

| | | |
|---|---|---|
| 8,706,538 B1 | 4/2014 | Morinville |
| 9,824,316 B2 | 11/2017 | Junker |
| 9,984,059 B2 | 5/2018 | Studer |
| 2002/0107754 A1 | 8/2002 | Stone |
| 2004/0034848 A1* | 2/2004 | Moore ............ G06N 5/047 717/117 |
| 2004/0260667 A1 | 12/2004 | Huelsman |
| 2006/0190310 A1* | 8/2006 | Gudla ............ G06Q 10/04 705/7.11 |
| 2007/0006190 A1 | 1/2007 | Surasinghe |
| 2007/0100717 A1* | 5/2007 | Holmes ............ G06Q 40/00 705/35 |
| 2007/0156511 A1 | 7/2007 | Arlt |
| 2011/0082826 A1* | 4/2011 | Junker ............ G06N 7/005 706/47 |
| 2012/0215731 A1 | 8/2012 | Junker |
| 2014/0006095 A1 | 1/2014 | Doran |
| 2014/0282396 A1* | 9/2014 | Manjarekar ........ G06F 8/74 717/120 |
| 2014/0341369 A1 | 11/2014 | Chang |
| 2015/0293764 A1 | 10/2015 | Visvanathan |
| 2018/0046965 A1 | 2/2018 | Berlandier |

OTHER PUBLICATIONS

IBM, "A Method to Determine a Relative Ranking of Customers Credit Worthiness," An IP.com Prior Art Database Technical Disclosure, Nov. 26, 2001, pp. 1-4, IP.com No. IPCOM000015032D.

Mell et al., "The NIST Definition of Cloud Computing," National Institute of Standards and Technology, Sep. 2011, pp. 1-3, Special Publication 800-145.

Mezzanzanica et al., "A Model-Based Approach for Developing Data Cleansing Solutions," ACM Journal of Data and Information Quality, Feb. 2015, pp. 1-28, vol. 5, No. 4, Article 13.

Nambiar et al., "Data Augmentation as a Service for Single View Creation," IEEE International Conference on Services Computing, 2011, pp. 40-47, IEEE Computer Society.

Pillat et al., "Ensuring Consistency of Feature-Based Decisions with a Business Rule System," VaMoS '13, Jan. 23-25, 2013, 8 Pages, ACM, Pisa, Italy.

* cited by examiner

EXECUTING A SET OF BUSINESS RULES ON INCOMPLETE DATA

BACKGROUND

The present invention relates, generally, to the field of computing, and more particularly to business rule management systems.

Business rule management systems are software programs designed to manage enterprise decision logic. The enterprise decision logic, referred to as business rules, may include conditional statements, requirements, and policies used to determine specific actions to be taken by systems and applications. A business rule management system may include a data repository, a set of authoring and governance tools to maintain and define the decision logic, and a runtime environment in which to execute the decision logic. The data repository may store the decision logic as a set of artifacts made available by the business rule management system.

SUMMARY

According to one embodiment, a method for executing a plurality of business rules on a plurality of incomplete data is provided. The method may include receiving the plurality of business rules, an object model, and a plurality of ruleset parameters. The method may also include generating a dependency tree based on the received plurality of business rules, the received object model, and the received plurality of ruleset parameters, whereby the dependency tree presents a set of data elements needed for evaluating a corresponding business rule in the received plurality of business rules. The method may further include generating a plurality of ruleset source code based on the created dependency tree that allows for disabling at least one of the received plurality of business rules. The method may also include determining a plurality of data corresponding to the presented set of data elements needed for evaluating the corresponding business rule is unavailable. The method may further include disabling the corresponding business rule based on determining the plurality of data is unavailable.

According to another embodiment, a computer system for executing a plurality of business rules on a plurality of incomplete data is provided. The computer system may include one or more processors, one or more computer-readable memories, one or more computer-readable tangible storage devices, and program instructions stored on at least one of the one or more storage devices for execution by at least one of the one or more processors via at least one of the one or more memories, whereby the computer system is capable of performing a method. The method may include receiving the plurality of business rules, an object model, and a plurality of ruleset parameters. The method may also include generating a dependency tree based on the received plurality of business rules, the received object model, and the received plurality of ruleset parameters, whereby the dependency tree presents a set of data elements needed for evaluating a corresponding business rule in the received plurality of business rules. The method may further include generating a plurality of ruleset source code based on the created dependency tree that allows for disabling at least one of the received plurality of business rules. The method may also include determining a plurality of data corresponding to the presented set of data elements needed for evaluating the corresponding business rule is unavailable. The method may further include disabling the corresponding business rule based on determining the plurality of data is unavailable.

According to yet another embodiment, a computer program product for executing a plurality of business rules on a plurality of incomplete data is provided. The computer program product may include one or more computer-readable storage devices and program instructions stored on at least one of the one or more tangible storage devices, the program instructions executable by a processor. The computer program product may include program instructions to receive the plurality of business rules, an object model, and a plurality of ruleset parameters. The computer program product may also include program instructions to generate a dependency tree based on the received plurality of business rules, the received object model, and the received plurality of ruleset parameters, whereby the dependency tree presents a set of data elements needed for evaluating a corresponding business rule in the received plurality of business rules. The computer program product may further include program instructions to generate a plurality of ruleset source code based on the created dependency tree that allows for disabling at least one of the received plurality of business rules. The computer program product may also include program instructions to determine a plurality of data corresponding to the presented set of data elements needed for evaluating the corresponding business rule is unavailable. The computer program product may further include program instructions to disable the corresponding business rule based on determining the plurality of data is unavailable.

BRIEF DESCRIPTION OF THE SEVERAL VIEWS OF THE DRAWINGS

These and other objects, features, and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
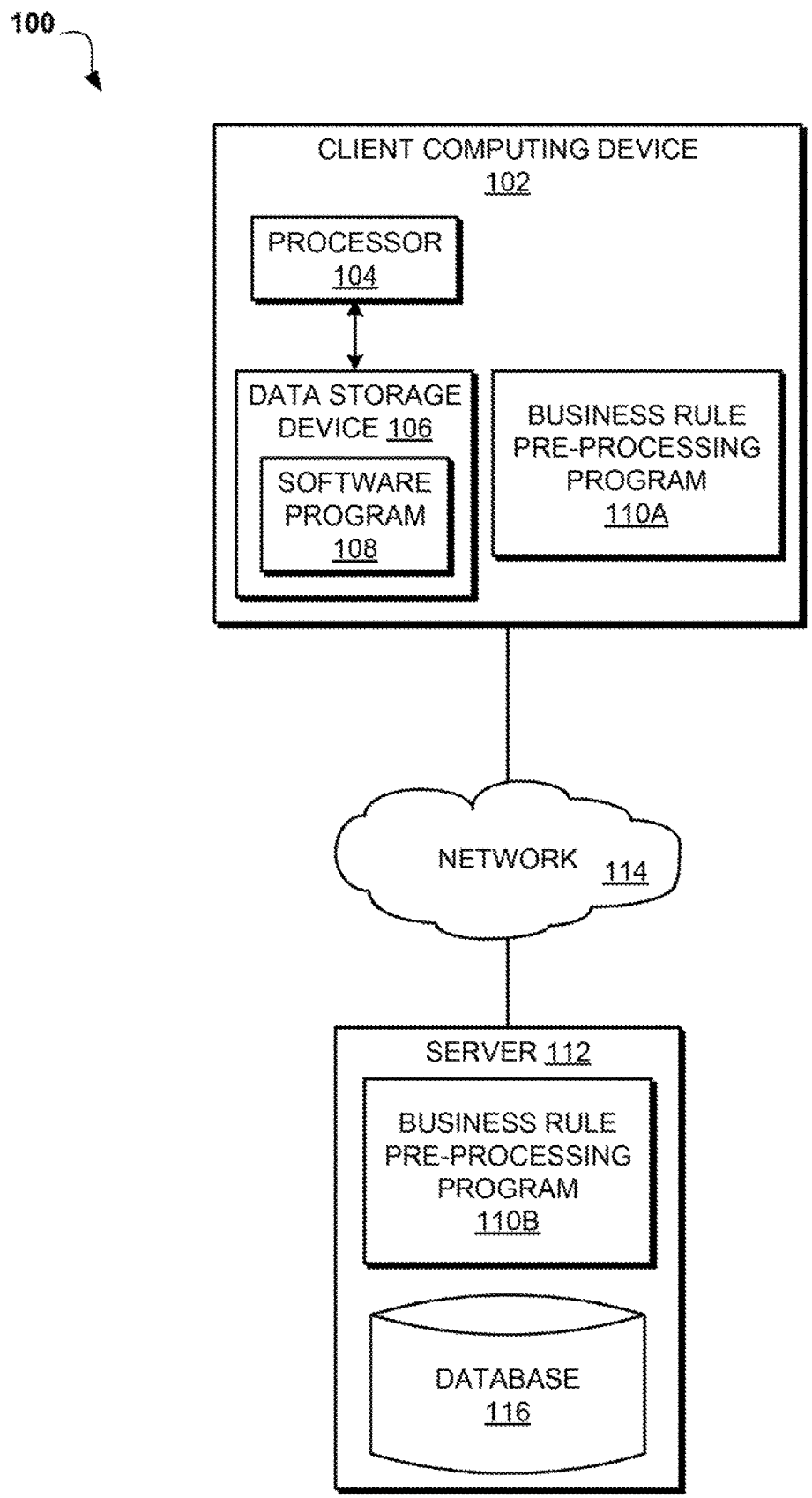
FIG. 1 illustrates an exemplary networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

Embodiments of the present invention are related to the field of computing, and more particularly to business rule management systems. The following described exemplary embodiments provide a system, method, and program product to, among other things, implement a system for executing business rules on potentially incomplete data based on pre-processing phases during compilation time and execution time. Therefore, the present embodiment has the capacity to improve the technical field of business rule management systems by enhancing the performance of the rule execution process. More specifically, resources may be saved by focusing on rules that can be fully executed based on the data within a repository.

As previously described, business rule management systems are software programs designed to manage enterprise decision logic. The enterprise decision logic, referred to as business rules, may include conditional statements, requirements, and policies used to determine specific actions to be taken by systems and applications. A business rule management system may include a data repository, a set of authoring and governance tools to maintain and define the decision logic, and a runtime environment in which to execute the decision logic. The data repository may store the decision logic as a set of artifacts mad available to the business rule management system.

Business rule management systems may provide an efficient platform to manage and execute business decisions as a set of business rules. In particular, business rule management systems may be a great tool to implement validation applications in business processes and other enterprise applications. For example, checking whether a line item in a medical claim should be paid or determining whether an online purchase or money transfer is possibly fraudulent. Furthermore, business rule management system technology may allow for rapid changes to and redeployment of the business rules to adapt to new regulations or behaviors and direct management of rules by non-developer individuals.

A key characteristic of validation applications is the ability to receive and process incomplete data, such as portions of a customer's address being undefined or the inability to retrieve historical transactions for a customer. Therefore, a best effort strategy should be applied to the validation decision process so that as many areas as possible may be processed with the available data.

Typically, business rules are self-contained, executable artifacts which can each produce value through their individual execution. Such practice makes the previously mentioned best practice strategy easier to apply since rules can be individually considered. Therefore, rules for which all data points in respective conditions are known may be executed and the applicable validation activity may thereby allow rules for which a data point is unknown to be ignored.

Many different rules may be applicable when evaluating different criteria. Such rules may be executed independently from each other but individually contribute some value to the risk estimation process. For example, a credit card application validation decision tree may include the following rules when determining the risk associated with a particular individual's application for a credit card:

Rule R1
if
zip code of the current address of the card applicant is in the list of high risk zip codes
then
increase the risk indicator by 5 points;
Rule R2
if
FICO score of the credit report of the card applicant is less than 600
then
increase the risk indicator by 12 points;
Rule R3
if
card applicant is under 25 years old
then
increase the risk indicator by 2 points;

The data points in the underlying object model required for the above mentioned rules to be executed may be:

Rule R1
CardApplication.getApplicant( ).getCurrentAddress( ).getZipCode( )
Rule R2
CardApplication.getApplicant( ).getCreditReport( ).getFicoScore( )
Rule R3
CardApplication.getApplicant( ).getDateOfBirth( )

Therefore, Rule 1 may only be executable if the provided data includes the card application data structure, a defined applicant, the applicant address, and a zip code for the applicant address. If any item is unknown, Rule 1 may not be applied, and can be ignored for execution. Deciding whether a rule can be executed with respect to the data that is provided can be achieved using two different approaches: a brute force approach or a defensive programming approach.

The brute force approach may allow for the evaluation of the rule by wrapping the rule in an exception handling statement. If the evaluation of the rule conditions causes an exception, such as a null pointer exception, due to an unknown object, the exception handling mechanism may ensure that the overall rule engine execution can proceed with the subsequent rules. The brute force approach may be a simplistic method, however, significant time may be spent evaluating one or more conditions for a rule before determining the rule should not be applied.

The defensive programming approach may manage the evaluation of the data access in the rules through a rules engine that tests the availability of the data at each reference occurrence. For example, the code to evaluate a rule condition involving a reference to the zip code of a customer address may appear as follows:

```
if ( CardApplication == null ) {
    return false;
}
Applicant applicant = CardApplication.getApplicant( );
if ( applicant == null ) {
    return false;
}
Address address = applicant.getCurrentAddress( );
if ( address == null ) {
    return false;
}
String zip = address.getZipCode( );
if ( zip == null ) {
    return false;
}
return ( riskyZipCodes.contains(zip) );
```

The defensive programming approach may be costly since each variable access may require individual decomposition, evaluation, and testing.

Both the brute force approach and the defensive programming approach may spend valuable resources computing rules that may not contribute to the outcome of the decision due to unknown data. Additionally, a validation decision may often have a strong constraint on execution time since the validation decision may be involved in an online transaction processing system where a customer is waiting for the validation to proceed with the overall business process. As such, it may be advantageous to, among other things, implement an approach for executing business rules on potentially incomplete data, which is based on pre-processing phases at compilation time and execution time, to improve the performance of the rule execution process.

According to one embodiment, pre-processing may be applied to sets of business rules, first at compilation time and, then, at execution time, to determine which rules cannot be executed due to the omission or unavailability of at least one required data element within the payload provided to the rule execution engine. Utilizing pre-processing may improve performance of the evaluation of a rule without requiring additional work or user input. Furthermore, by creating an explicit mapping of the rules with the implemented data elements, the user of the business rule management system may survey which subset of data elements is the most crucial to the execution of the decision, and, at execution time, the user may enable the business rule management system to determine whether enough data elements are available to provide a meaningful decision.

The rules compilation-time phase may establish a mapping between the rules and the used data elements to generate code in the executable rule set that may be used to check the runtime availability of the data elements. The code generation may be configured through user-specific configuration data, which may define the subset of rules to omit from the mapping process, the set of data elements assumed to always be provided as part of the input (i.e. non-null data elements), a weight associated to the rules that characterizes the importance of each rule with respect to the validation process, and a threshold for the weighted sum of disabled rules over which the validation decision is assumed to be unreliable.

The rules execution time phase may begin by evaluating the code generated during the compilation time phase, checking which data elements are actually available from the input, and preemptively disabling the rules which rely on unknown elements. As a result, the majority of the rule execution process may focus on rules likely to contribute some value to the decision process rather than wasting valuable resources and time on rules that cannot be completely evaluated.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method, and program product to prepare rules to aid in evaluation at compilation time and execution time when a rule engine includes incomplete data.

Referring to FIG. 1, an exemplary networked computer environment 100 is depicted, according to at least one embodiment. The networked computer environment 100 may include a client computing device 102 and a server 112 interconnected via a communication network 114. According to at least one implementation, the networked computer environment 100 may include a plurality of client computing devices 102 and servers 112, of which only one of each is shown for illustrative brevity.

The communication network 114 may include various types of communication networks, such as a wide area network (WAN), local area network (LAN), a telecommunication network, a wireless network, a public switched network and/or a satellite network. The communication network 114 may include connections, such as wire, wireless communication links, or fiber optic cables. It may be appreciated that FIG. 1 provides only an illustration of one implementation and does not imply any limitations with regard to the environments in which different embodiments may be implemented. Many modifications to the depicted environments may be made based on design and implementation requirements.

The client computing device 102 may include a processor 104 and a data storage device 106 that is enabled to host and run a software program 108 and a business rule pre-processing program 110A and communicate with the server 112 via the communication network 114, in accordance with one embodiment of the invention. The client computing device 102 may be, for example, a mobile device, a telephone, a personal digital assistant, a netbook, a laptop computer, a tablet computer, a desktop computer, or any type of computing device capable of running a program and accessing a network. As will be discussed with reference to FIG. 6, the client computing device 102 may include internal components 602a and external components 604a, respectively.

The server computer 112 may be a laptop computer, netbook computer, personal computer (PC), a desktop computer, or any programmable electronic device or any network of programmable electronic devices capable of hosting and running a business rule pre-processing program 110B and a database 116 and communicating with the client computing device 102 via the communication network 114, in accordance with embodiments of the invention. As will be discussed with reference to FIG. 6, the server computer 112 may include internal components 602b and external components 604b, respectively. The server 112 may also operate in a cloud computing service model, such as Software as a Service (SaaS), Platform as a Service (PaaS), or Infrastructure as a Service (IaaS). The server 112 may also be located in a cloud computing deployment model, such as a private cloud, community cloud, public cloud, or hybrid cloud.

According to the present embodiment, the business rule pre-processing program 110A, 110B may be a program capable of, at compilation time, gathering a static set of dependencies between the rules and the data elements needed for evaluation. The business rule pre-processing program 110A, 110B may organize the dependencies in a tree structure which may mirror the structure of the object model for each input parameter of the ruleset. Once the dependency structures are defined, the business rule pre-processing program 110A, 110B may enrich the executable ruleset code with a pre-processing step to check the availability of data from the input payload. Subsequently, the business rule pre-processing program 110A, 110B may disable rules associated with the data elements when the value of the data elements is unavailable. At run-time, the business rule pre-processing program 110A, 110B may execute the generated code as the first action of the ruleset against the actual payload and disable the rules from the ruleset that should not be evaluated due to unknown data. The business rule pre-processing method is explained in further detail below with respect to FIGS. 2 and 3.

Figure 2:
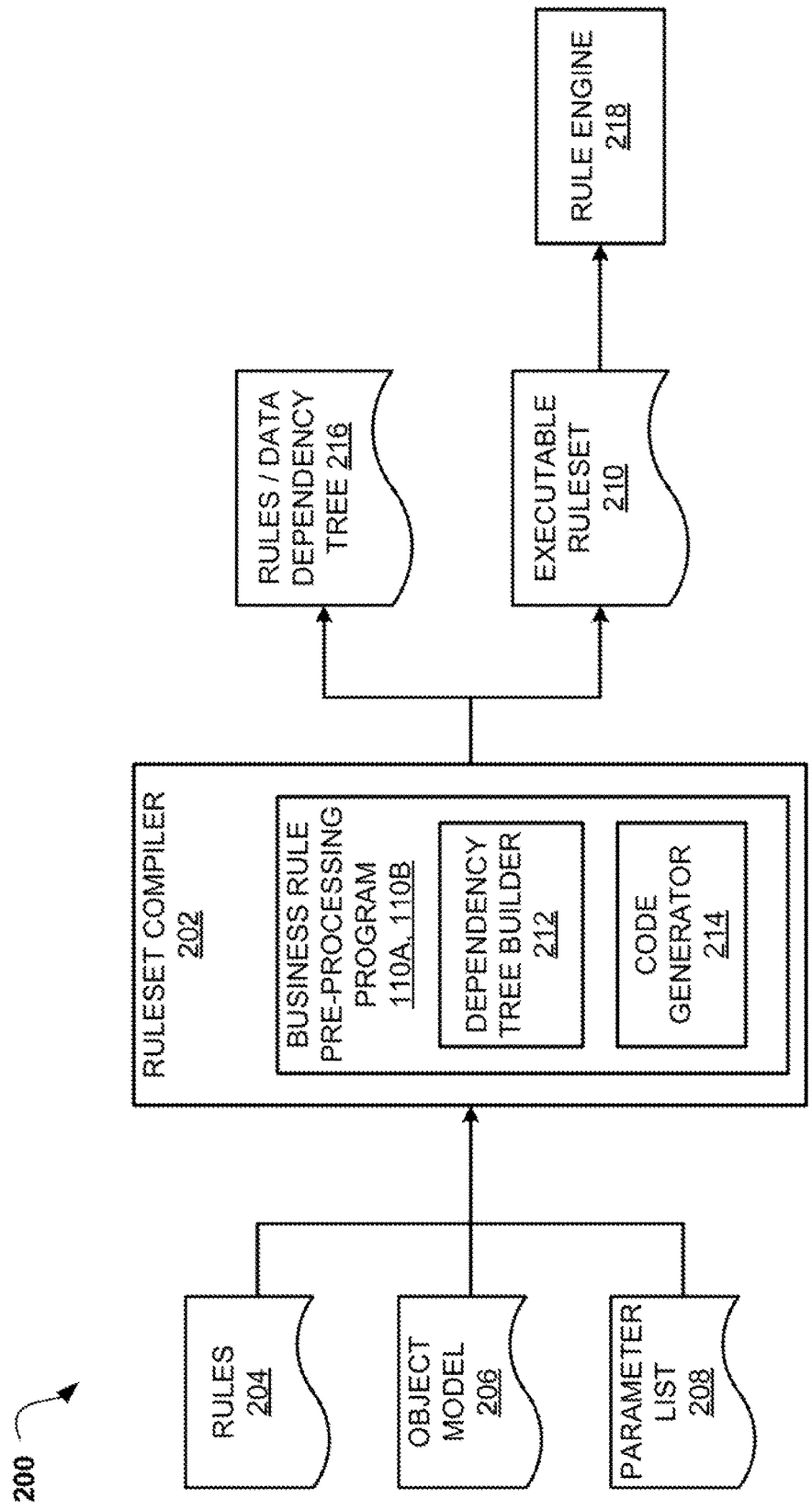
FIG. 2 is a functional block diagram of components of a business rule pre-processing system during the creation of a ruleset according to at least one embodiment.

Referring now to FIG. 2, a functional block diagram of components 200 of a business rule pre-processing system during the creation of a ruleset is depicted, according to at least one embodiment. The ruleset compiler 202 may be a program, such as software program 108, capable of receiving rules 204, an object model 206, and a parameter list 208, and creating an executable ruleset 210 by interacting with the business rule pre-processing program 110A, 110B. Furthermore, the business rule pre-processing program 110A, 110B within the ruleset compiler 202 may include a dependency tree builder 212 and a code generator 214. The dependency tree builder 212 may be capable of analyzing the rules 204, object model 206, and parameter list 208 to create a rules/data dependency tree 216 that interrelates the rules 204, object model 206, and parameter list 208. The code generator 214 may be capable of generating a series of executable source code and injecting the source code into an executable ruleset 210. The rule engine 218 may be a program, such as software program 108, capable of receiving the generated executable ruleset 210 and executing the executable ruleset 210 when necessary.

Figure 3:
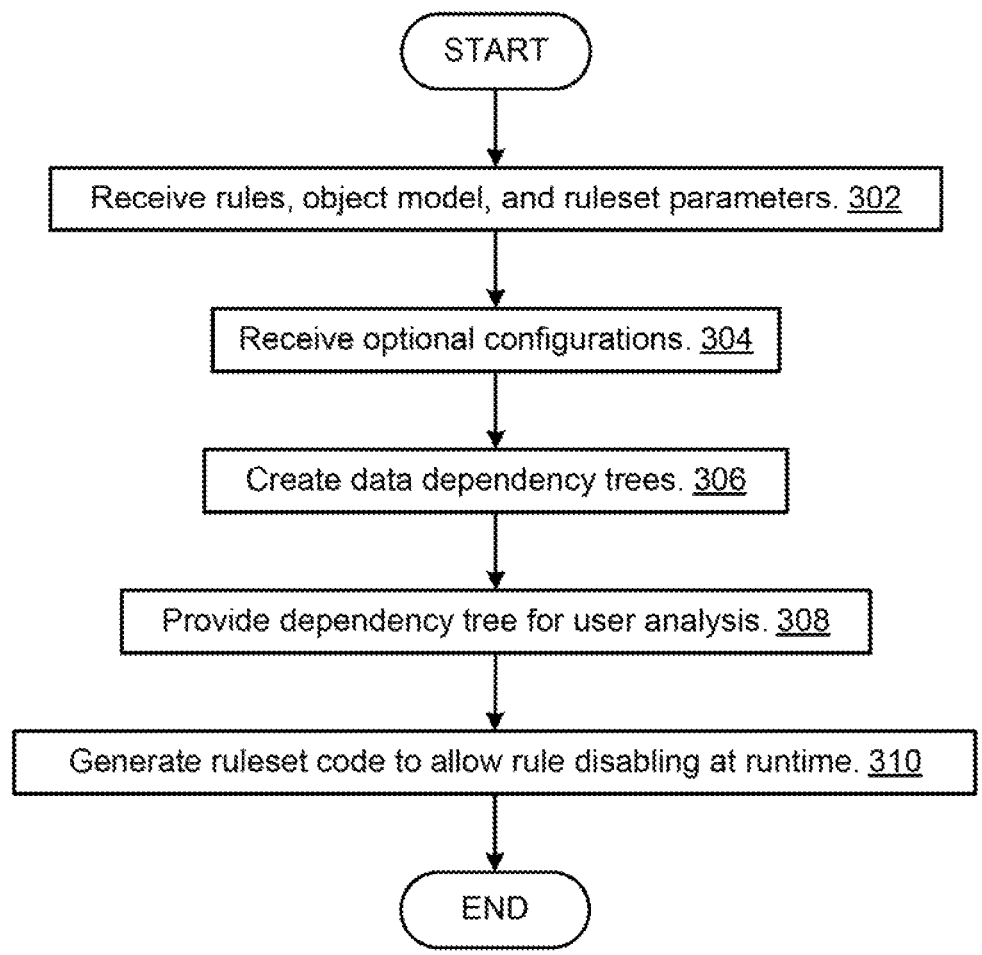
FIG. 3 is an operational flowchart illustrating a compilation time business rule pre-processing process according to at least one embodiment.

Referring now to FIG. 3, an operational flowchart illustrating a compilation time business rule pre-processing process 300 is depicted, according to at least one embodiment. At 302, the business rule pre-processing program 110A, 110B receives rules, an object model, and ruleset parameters. An object model may relate to a group of objects that a program, such as software program 108, can manipulate or analyze. For example, an object model may be represented by the data fields of an online credit card application. The ruleset parameters may relate to objects within the object model. For example, in an online credit card application, an object may have the parameter name of Applicant and sub-parameters of currentAddress, creditReport, and dateofBirth. Furthermore, the ruleset parameters may be instances of a root class of the object model. In the previous example, the root class may be the credit card application. As previously described, a business rule may include conditional statements, requirements, and policies used to determine specific actions to be taken by systems and applications. For example, in the previously described example of an online credit card application, a rule may require a credit card applicant to have a valid FICO score in the CreditReport object to be approved for a credit card.

Then, at 304, the business rule pre-processing program 110A, 110B receives optional configurations based on user interactions. The business rule pre-processing program 110A, 110B may allow for users to define a variety of optional configurations to be applicable to generated code, such as always-executed rules, excluded rules, known non-null data, rule weights, and ruleset thresholds. For example, a user may wish for the business rule pre-processing program 110A, 110B to exclude, or ignore, a specific rule during execution time regardless of whether unknown data is present that would cause the rule to fail. An excluded rule may be a rule that is not included in the creation of the dependency tree and, therefore, not be involved during execution. Rules that may be excluded include technical rules that serve a general purpose and rules that perform ancillary tasks to the main task of the source code. If the user designates that the business rule pre-processing program 110A, 110B should ignore this rule, the business rule pre-processing program 110A, 110B may allow the rule to fail if data required for successful execution of the rule is unknown. Furthermore, an always-executed rule may refer to a business rule the user wishes to have executed regardless of whether the data is known or unknown. Additionally, rule weights may relate to the importance of a specific rule with the ruleset. For example, if a rule is critical to the execution of the ruleset, the user may designate a weight to the rule that will not allow the business rule pre-processing program 110A, 110B to execute the ruleset if data is unknown that would be required to execute the rule. Furthermore, a ruleset threshold may be a user preconfigured value that relates weights attributed to each disabled rule within the ruleset. The business rule pre-processing program 110A, 110B may determine whether a ruleset threshold is exceeded by comparing the sum of the weights associated with the total number of disabled rules. The formula for this calculation may be represented as SUM(rule weight associated with disabled rules)>=threshold_value. For example, if the user configures the ruleset threshold to only execute the ruleset when more than half of the rules are enabled, then, for a ruleset with five rules, the business rule pre-processing program 110A, 110B may not execute the ruleset when three rules have been disabled due to unknown data. The formula of the ruleset threshold in such a situation may be represented as total_rule_#/2 when the weight of each rule is assigned a value of 1.

Next, at 306, the business rule pre-processing program 110A, 110B creates a data dependency tree using the received rules, object model, and ruleset parameters. A dependency tree may refer to a series of interrelated data within an object model. The dependency tree may include branches and leaves that contain information relevant to the hierarchy of the dependency tree. A dependency tree branch may be a diverging element of the dependency tree that differs from other branches and leaves relevant to a particular category of the dependency tree. A leaf may be an endpoint within the dependency tree that contains information relevant to the branch within which it is contained. The business rule pre-processing program 110A, 110B may create the data dependency tree by mapping the rules and the data within the ruleset parameters used by the rules within the object model. For each rule to be added to the ruleset that is not excluded based on optional user configurations, the business rule pre-processing program 110A, 110B may parse condition statements associated with a rule and extract all variable references used by the rule in the form of a path through the object model. For example, a path that traverses through a credit card application to determine the presence of data associated with a credit report for the applicant may be represented as CardApplication/applicant/creditReport. When adding a rule to the dependency tree, the business rule pre-processing program 110A, 110B may simply add the rule to the existing dependency tree if the branch on which the rule traverses within the dependency tree already exists. However, if the branch on which the rule traverses the dependency tree does not exist and the path is not covered by the non-null data configuration, the business rule pre-processing program 110A, 110B may add a branch to the dependency tree by building the branch from the path to the tree rooted in the ruleset parameter. Furthermore, the business rule pre-processing program 110A, 110B may set the rule name of the added rule as the node information for the new leaf of the dependency tree.

Then, at 308, the business rule pre-processing program 110A, 110B provides the dependency tree for user analysis. The generated dependency tree produced as a result of the ruleset compilation may be inspected by the user to gather insights about the dependencies and determine which data elements may be most critical to the evaluation of the rules. The business rule pre-processing program 110A, 110B may provide the dependency tree for user analysis by displaying the dependency tree within a graphical user interface or presentation as a log file. Furthermore, the business rule pre-processing program 110A, 110B may allow a user to provide feedback to the provided dependency tree. Similar to the optional configurations within step 304, the user may establish user feedback to the dependency tree, such as excluded rules, known non-null data, rule weights, and rule thresholds. For example, upon observing the dependency tree, the user may determine a particular rule is essential to the execution of the ruleset. Therefore, the user may apply a particular weight to a rule to indicate to the business rule pre-processing program 110A, 110B that the rule receiving the weight is essential to the ruleset.

Next, at 310, the business rule pre-processing program 110A, 110B generates ruleset code to allow rule disabling at runtime. In order to generate the ruleset code, the business rule pre-processing program 110A, 110B may generate a statement that creates empty tree instances. Furthermore, the business rule pre-processing program 110A, 110B may create additional statements that, when executed, add nodes to the dependency tree. For example, a statement that adds a node to the dependency tree may be depicted as tree-.addNode(P,R) where P is the rule path and R is the particular rule. Additionally, the business rule pre-processing program 110A, 110B may draft source code that, for each node within the dependency tree, determines whether the path to the data element yields a known value. If the path does not yield a known value, the business rule pre-processing program 110A, 110B may identify all descendant nodes and disable the rules associated with each collected descendent node. Additionally, the business rule pre-processing program 110A, 110B may inject source code that, when executed, sums the weight of all disabled rules for a given payload. If the sum is over the ruleset threshold, the business rule pre-processing program 110A, 110B may prevent the ruleset from executing.

Figure 4:
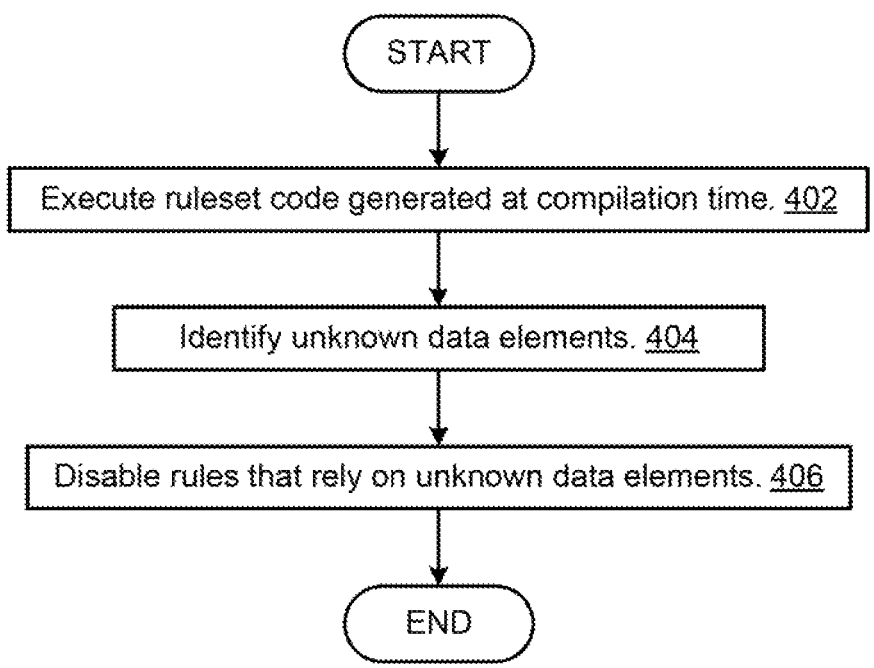
FIG. 4 is an operational flowchart illustrating an execution time business rule pre-processing process according to at least one embodiment.

Referring now to FIG. 4, an operational flowchart illustrating an execution time business rule pre-processing process 400 is depicted, according to at least one embodiment. At 402, the business rule pre-processing program 110A, 110B executes the ruleset code generated at compilation time. The business rule pre-processing program 110A, 110B may determine the compilation time generated ruleset code should be executed based on user interactions with a user interface or through the satisfaction of previously established conditions precedent, such as the passage of a predetermined period of time.

Then, at 404, the business rule pre-processing program 110A, 110B identifies unknown data elements within the dependency tree. When executing the ruleset code, the business rule pre-processing program 110A, 110B may identify unknown elements within the dependency tree by parsing through each branch of the dependency tree. For example, if a rule uses credit report information included within a credit card application, the business rule pre-processing program 110A, 110B may traverse the dependency tree branch to determine whether information related to the applicant's credit report is present within a leaf of the dependency tree. If the credit report information is not present, the business rule pre-processing program 110A, 110B may identify the credit report information as an unknown data element.

Next, at 406, the business rule pre-processing program 110A, 110B disables rules that rely on unknown data elements within the dependency tree. Once the business rule pre-processing program 110A, 110B identifies the unknown data elements within the dependency tree, the business rule pre-processing program 110A, 110B may disable the rules that rely on the unknown data elements. However, the business rule pre-processing program 110A, 110B may not disable a rule that includes unknown data elements based on the optional configurations applied to the dependency tree. For example, a user may have applied a weight to an unknown data element that would prevent the rule from being disabled. As an additional example, after disabling applicable rules, the business rule pre-processing program 110A, 110B may compute an objective function on the set of disabled rules to decide whether the business decision execution should proceed given the number and value of the rules that have been disabled. If rule weights were previously provided through user configurations, the business rule pre-processing program 110A, 110B may also compute the sum of the weights for the set of disabled rules. If the sum of the weights exceeds a given threshold, the business rule pre-processing program 110A, 110B may prevent ruleset execution. The generated ruleset code may be injected into the source code to be executed at runtime to provide the capability to disable rules based on the dependency tree and actual data.

Figure 5:
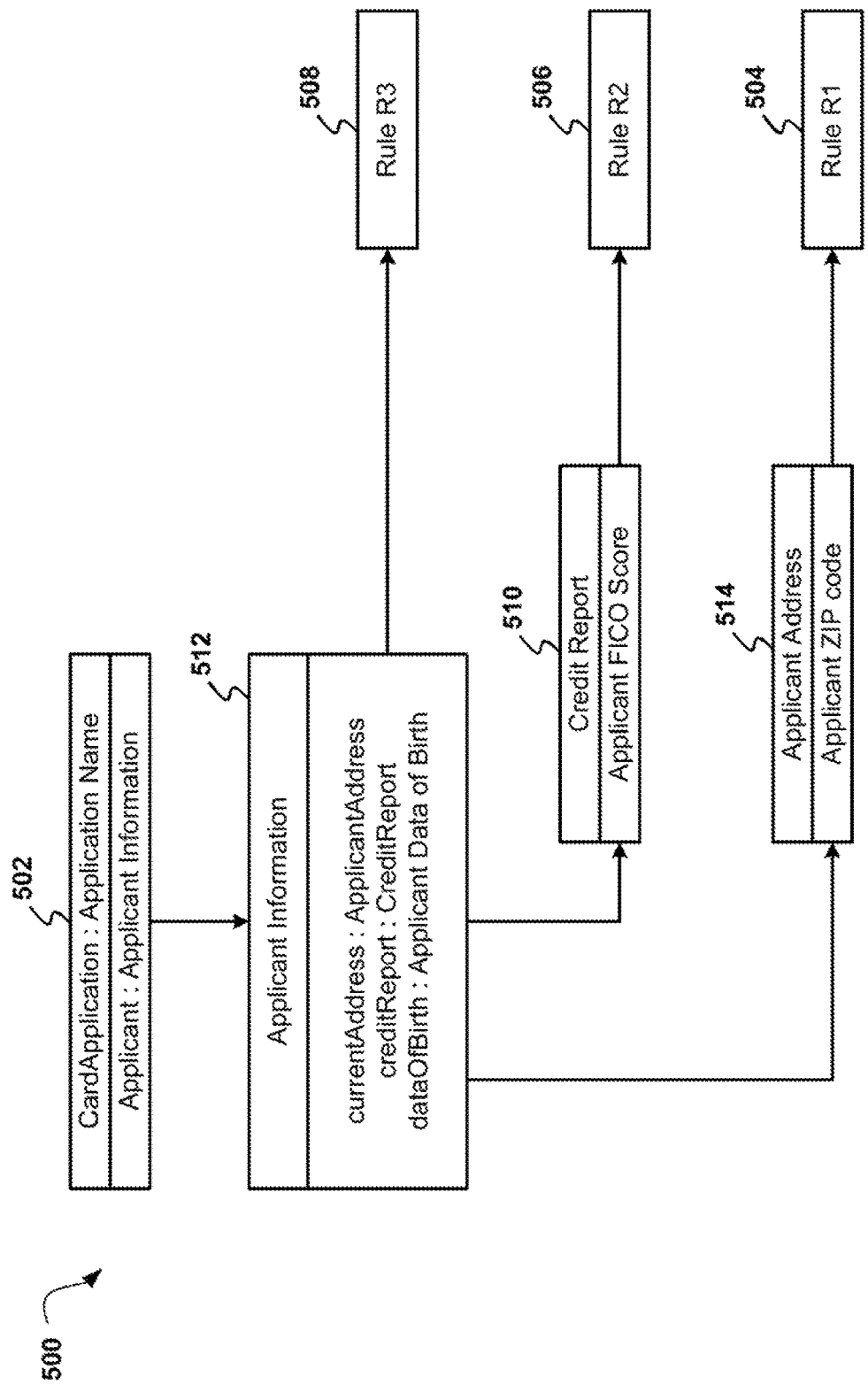
FIG. 5 is functional block diagram of a dependency tree utilized by a business rule pre-processing system according to at least one embodiment.

Referring now to FIG. 5, a functional block diagram of a dependency tree 500 utilized by a business rule pre-processing system is depicted, according to at least one embodiment. The dependency tree 500 represents the information relevant to a credit card application 502 used by a series of rules, such as rule R1 504, rule R2 506, and rule R3 508. Additionally, the dependency tree 500 may include nodes, such as a credit report node 510, an applicant information node 512, and an applicant address node 514. For a given node in the dependency tree 500, if an object corresponding to the node is unknown, all rules associated to the branch of the dependency tree 500 should be disabled. For example, if the credit report node 510 contains unknown information relating to the applicant's FICO score, rule R2 506 may not be evaluated and the business rule pre-processing program 110A, 110B may disable rule R2 506. As an additional example, if the applicant information node 512 contains unknown information, rule R1 504, rule R2 506, and rule R3 508 may not be capable of evaluation and the business rule pre-processing program 110A, 110B may disable rule R1 504, rule R2 506, and rule R3 508.

It may be appreciated that FIGS. 2, 3, 4, and 5 provide only an illustration of one implementation and do not imply any limitations with regard to how different embodiments may be implemented. Many modifications to the depicted environments may be made based on design and implementation requirements.

Figure 6:
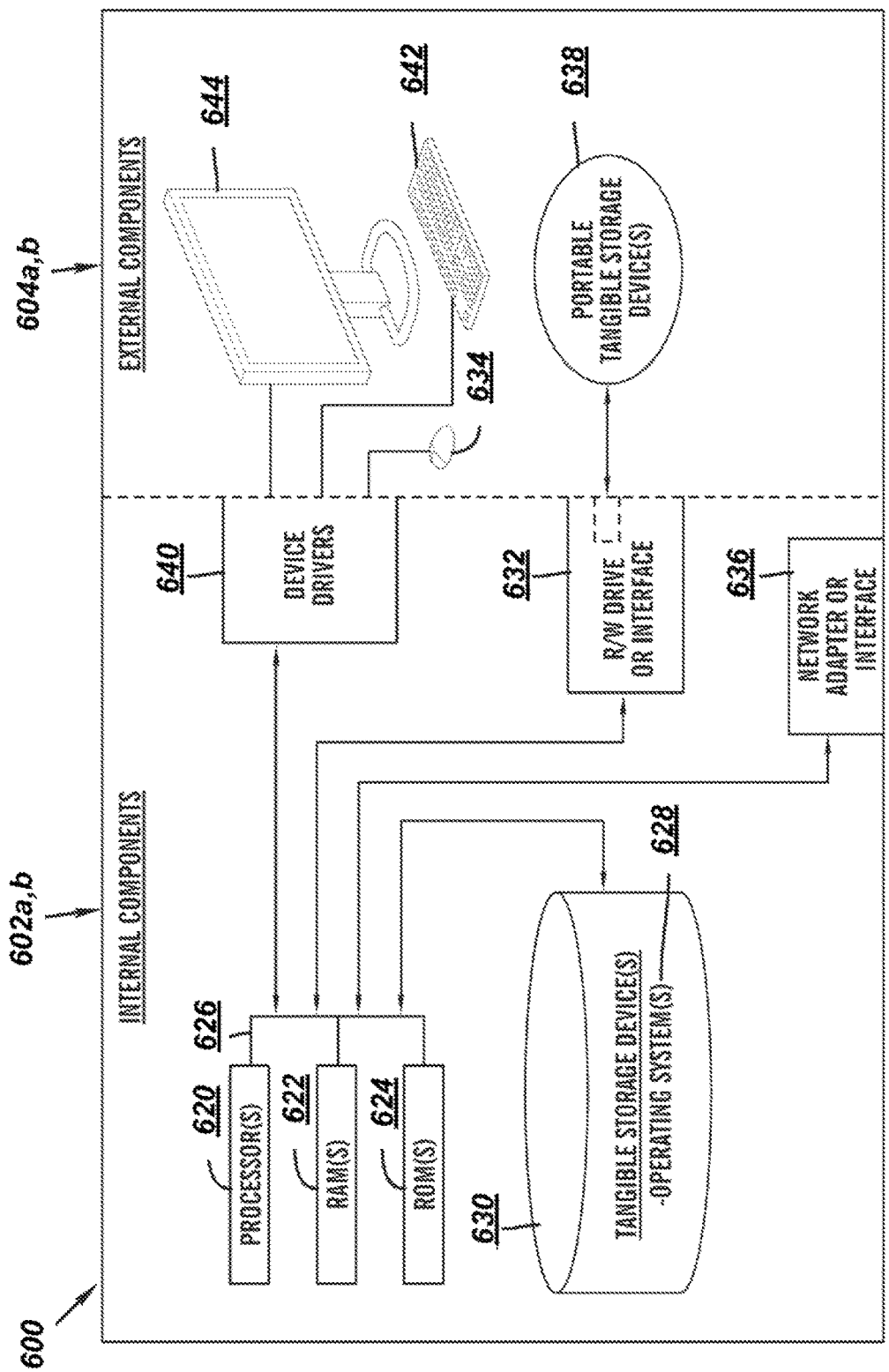
FIG. 6 is a block diagram of internal and external components of computers and servers depicted in FIG. 1 according to at least one embodiment.

FIG. 6 is a block diagram 600 of internal and external components of the client computing device 102 and the server 112 depicted in FIG. 1 in accordance with an embodiment of the present invention. It should be appreciated that FIG. 6 provides only an illustration of one implementation and does not imply any limitations with regard to the environments in which different embodiments may be implemented. Many modifications to the depicted environments may be made based on design and implementation requirements.

The data processing system 602, 604 is representative of any electronic device capable of executing machine-readable program instructions. The data processing system 602, 604 may be representative of a smart phone, a computer system, PDA, or other electronic devices. Examples of computing systems, environments, and/or configurations that may represented by the data processing system 602, 604 include, but are not limited to, personal computer systems, server computer systems, thin clients, thick clients, handheld or laptop devices, multiprocessor systems, microprocessor-based systems, network PCs, minicomputer systems, and distributed cloud computing environments that include any of the above systems or devices.

The client computing device 102 and the server 112 may include respective sets of internal components 602 *a,b* and external components 604 *a,b* illustrated in FIG. 6. Each of the sets of internal components 602 include one or more processors 620, one or more computer-readable RAMs 622, and one or more computer-readable ROMs 624 on one or more buses 626, and one or more operating systems 628 and one or more computer-readable tangible storage devices 630. The one or more operating systems 628, the software program 108 and the business rule pre-processing program 110A in the client computing device 102, and the business rule pre-processing program 110B in the server 112 are stored on one or more of the respective computer-readable tangible storage devices 630 for execution by one or more of the respective processors 620 via one or more of the respective RAMs 622 (which typically include cache memory). In the embodiment illustrated in FIG. 6, each of the computer-readable tangible storage devices 630 is a magnetic disk storage device of an internal hard drive. Alternatively, each of the computer-readable tangible storage devices 630 is a semiconductor storage device such as ROM 624, EPROM, flash memory or any other computer-readable tangible storage device that can store a computer program and digital information.

Each set of internal components 602 a,b also includes a R/W drive or interface 632 to read from and write to one or more portable computer-readable tangible storage devices 638 such as a CD-ROM, DVD, memory stick, magnetic tape, magnetic disk, optical disk or semiconductor storage device. A software program, such as the business rule pre-processing program 110A, 110B, can be stored on one or more of the respective portable computer-readable tangible storage devices 638, read via the respective R/W drive or interface 632, and loaded into the respective hard drive 630.

Each set of internal components 602 a,b also includes network adapters or interfaces 636 such as a TCP/IP adapter cards, wireless Wi-Fi interface cards, or 3G or 4G wireless interface cards or other wired or wireless communication links. The software program 108 and the business rule pre-processing program 110A in the client computing device 102, and the business rule pre-processing program 110B in the server 112 can be downloaded to the client computing device 102 and the server 112 from an external computer via a network (for example, the Internet, a local area network or other, wide area network) and respective network adapters or interfaces 636. From the network adapters or interfaces 636, the software program 108 and business rule pre-processing program 110A in the client computing device 102, and the business rule pre-processing program 110B in the server 112 are loaded into the respective hard drive 630. The network may comprise copper wires, optical fibers, wireless transmission, routers, firewalls, switches, gateway computers and/or edge servers.

Each of the sets of external components 604 a,b can include a computer display monitor 644, a keyboard 642, and a computer mouse 634. External components 604 a,b can also include touch screens, virtual keyboards, touch pads, pointing devices, and other human interface devices. Each of the sets of internal components 602 a,b also includes device drivers 640 to interface to computer display monitor 644, keyboard 642, and computer mouse 634. The device drivers 640, R/W drive or interface 632, and network adapter or interface 636 comprise hardware and software (stored in storage device 630 and/or ROM 624).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 7:
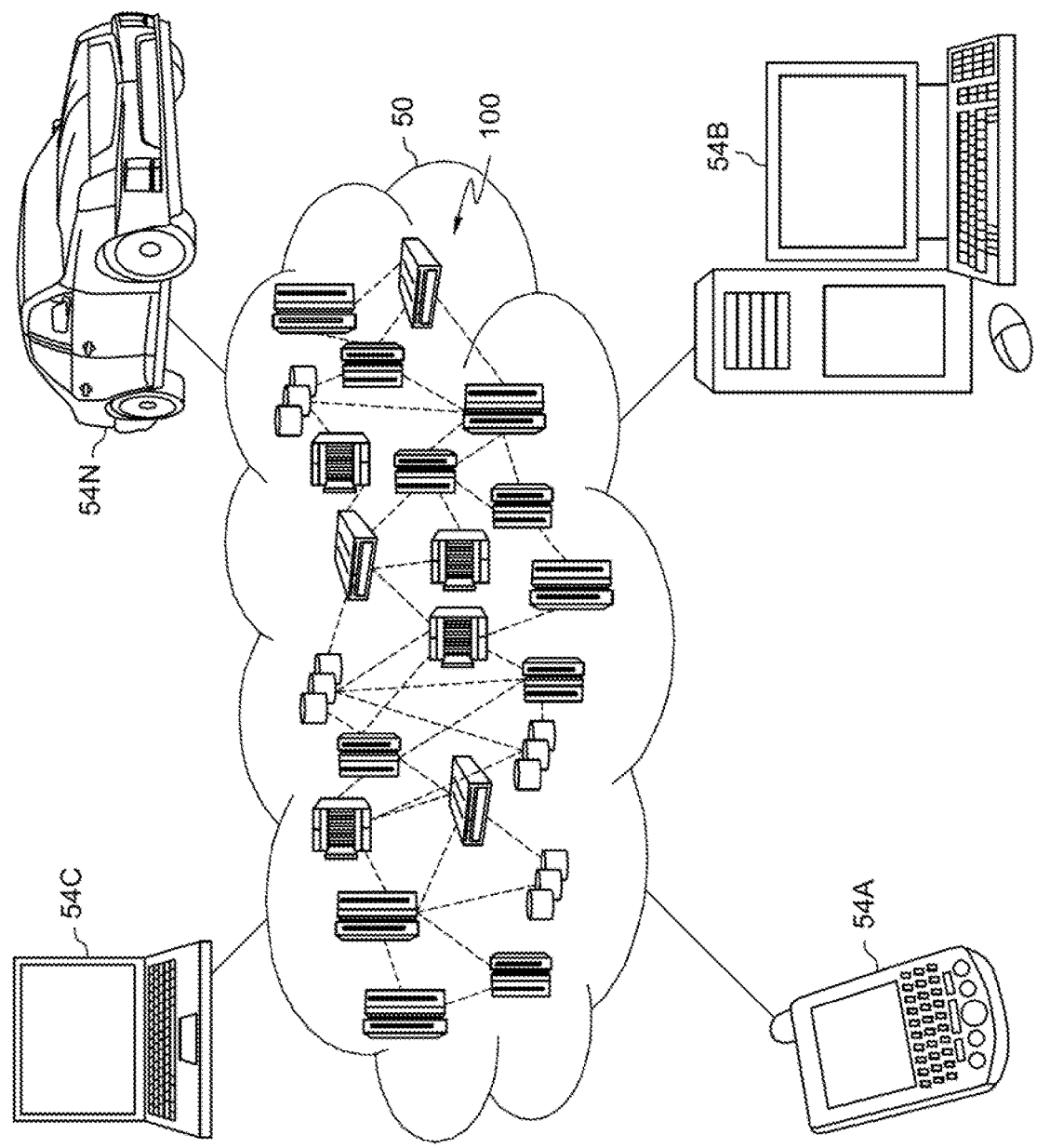
FIG. 7 depicts a cloud computing environment according to an embodiment of the present invention.

Referring now to FIG. 7, illustrative cloud computing environment 50 is depicted. As shown, cloud computing environment 50 comprises one or more cloud computing nodes 100 with which local computing devices used by cloud consumers, such as, for example, personal digital assistant (PDA) or cellular telephone 54A, desktop computer 54B, laptop computer 54C, and/or automobile computer system 54N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 100 and cloud computing environment 50 can communicate with any type of computerized device over any type of network and/or network addressable connection (e.g., using a web browser).

Figure 8:
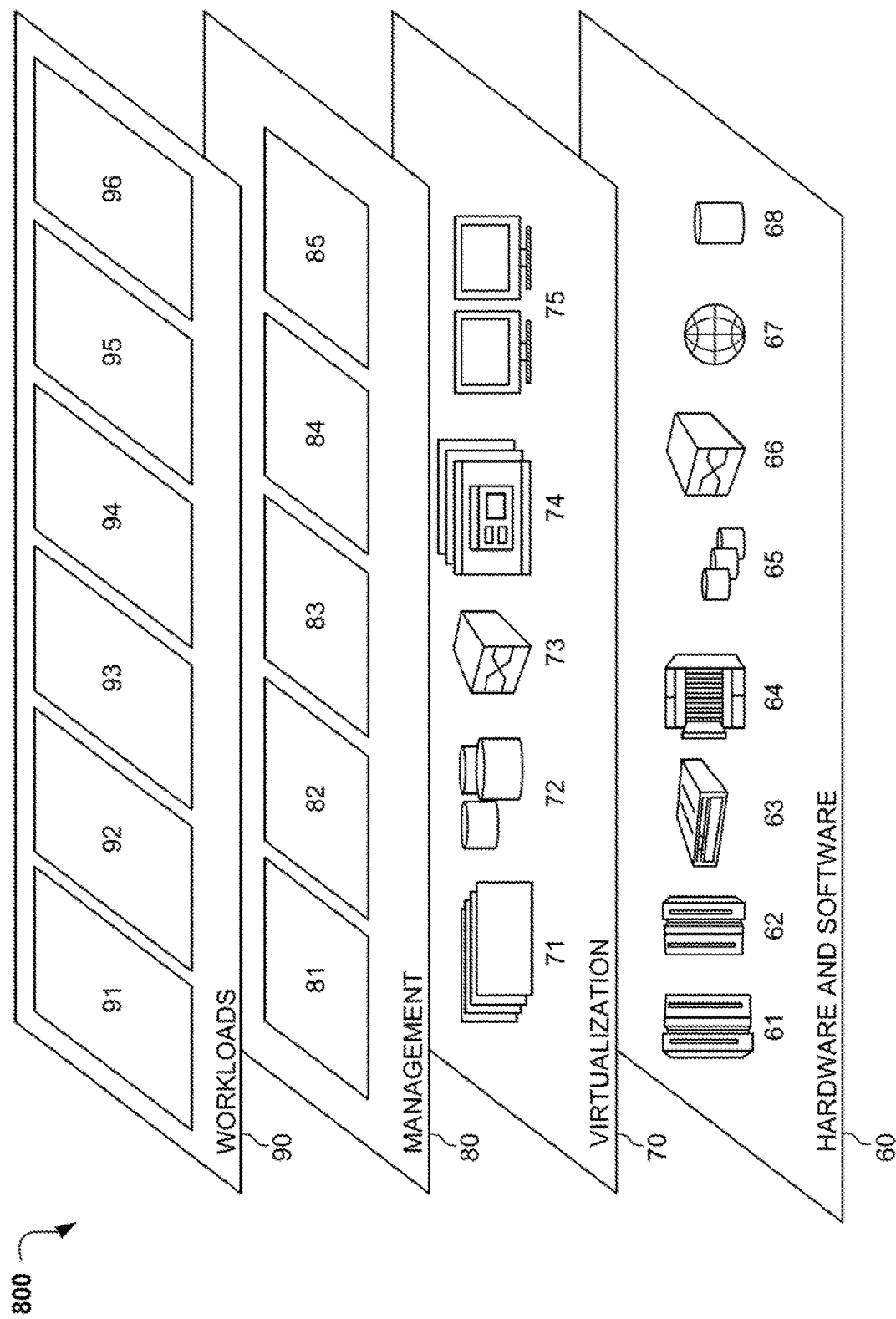
FIG. 8 depicts abstraction model layers according to an embodiment of the present invention.

Referring now to FIG. 8 a set of functional abstraction layers 800 provided by cloud computing environment 50 is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and business rule pre-processing 96. Business rule pre-processing 96 may relate to generating a rule dependency tree that interconnects rules with available data in an object model and allowing for the disabling of specific rules based on unavailable data within an executable ruleset.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A processor-implemented method for executing a plurality of business rules on a plurality of incomplete data, the method comprising:

generating a dependency tree based on a plurality of business rules, an object model, and a plurality of ruleset parameters, wherein the dependency tree presents a set of data elements needed for evaluating a corresponding business rule in the received plurality of business rules;

generating a plurality of ruleset source code based on the created dependency tree that allows for disabling at least one of the received plurality of business rules;

disabling the corresponding business rule based on the plurality of data being unavailable;

injecting a plurality of source code that, when executed, sums a weight of all disabled rules for a given payload; and in response to a sum of the weights satisfying a threshold, preventing the plurality of ruleset source code from executing.

2. The method of claim 1, further comprising:
executing the received plurality of business rules without the disabled business rule.

3. The method of claim 1, further comprising:
determining to not disable a business rule based on a weight associated with the business rule.

4. The method of claim 1, further comprising:
receiving a plurality of user configurations associated with each business rule within a ruleset.

5. The method of claim 4, wherein the received plurality of user configurations are selected from a group consisting of an always-executed business rule, a plurality of known non-null data, a plurality of business rule weights, and a business ruleset threshold.

6. The method of claim 1, wherein generating the dependency tree further comprises:
parsing each business rule within the received plurality of business rules to determine a rule path traversed by the rule through the dependency tree; and
in response to the dependency tree not containing a branch traversed by the rule path, adding the branch to the dependency tree utilizing the received plurality of ruleset parameters.

7. The method of claim 1, further comprising:
presenting the generated dependency tree to a user for analysis; and
receiving a plurality of user feedback to the presented dependency tree based on a plurality of user interactions with a user interface.

8. A computer system for executing a plurality of business rules on a plurality of incomplete data, the computer system comprising:
one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:
generating a dependency tree based on a plurality of business rules, an object model, and a plurality of ruleset parameters, wherein the dependency tree presents a set of data elements needed for evaluating a corresponding business rule in the received plurality of business rules;
generating a plurality of ruleset source code based on the created dependency tree that allows for disabling at least one of the received plurality of business rules;
disabling the corresponding business rule based on the plurality of data being unavailable;
injecting a plurality of source code that, when executed, sums a weight of all disabled rules for a given payload; and
in response to a sum of the weights satisfying a threshold, preventing the plurality of ruleset source code from executing.

9. The computer system of claim 8, further comprising:
executing the received plurality of business rules without the disabled business rule.

10. The computer system of claim 8, further comprising:
determining to not disable a business rule based on a weight associated with the business rule.

11. The computer system of claim 8, further comprising:
receiving a plurality of user configurations associated with each business rule within a ruleset.

12. The computer system of claim 11, wherein the received plurality of user configurations are selected from a group consisting of an always-executed business rule, a plurality of known non-null data, a plurality of business rule weights, and a business ruleset threshold.

13. The computer system of claim 8, wherein generating the dependency tree further comprises:
parsing each business rule within the received plurality of business rules to determine a rule path traversed by the rule through the dependency tree; and
in response to the dependency tree not containing a branch traversed by the rule path, adding the branch to the dependency tree utilizing the received plurality of ruleset parameters.

14. The computer system of claim 8, further comprising:
presenting the generated dependency tree to a user for analysis; and
receiving a plurality of user feedback to the presented dependency tree based on a plurality of user interactions with a user interface.

15. A computer program product for executing a plurality of business rules on a plurality of incomplete data, the computer program product comprising:
one or more computer-readable tangible storage medium and program instructions stored on at least one of the one or more tangible storage medium, the program instructions executable by a processor capable of performing a method, the method comprising:
generating a dependency tree based on a plurality of business rules, an object model, and a plurality of ruleset parameters, wherein the dependency tree presents a set of data elements needed for evaluating a corresponding business rule in the received plurality of business rules;
generating a plurality of ruleset source code based on the created dependency tree that allows for disabling at least one of the received plurality of business rules;
disabling the corresponding business rule based on the plurality of data being unavailable;
injecting a plurality of source code that, when executed, sums a weight of all disabled rules for a given payload; and
in response to a sum of the weights satisfying a threshold, preventing the plurality of ruleset source code from executing.

16. The computer program product of claim 15, further comprising:
executing the received plurality of business rules without the disabled business rule.

17. The computer program product of claim 15, further comprising:
determining to not disable a business rule based on a weight associated with the business rule.

18. The computer program product of claim 15, further comprising:
receiving a plurality of user configurations associated with each business rule within a ruleset.

19. The computer program product of claim 18, wherein the received plurality of user configurations are selected from a group consisting of an always-executed business rule, a plurality of known non-null data, a plurality of business rule weights, and a business ruleset threshold.

20. The computer program product of claim 15, wherein generating the dependency tree further comprises:
parsing each business rule within the received plurality of business rules to determine a rule path traversed by the rule through the dependency tree; and in response to the dependency tree not containing a branch traversed by the rule path, adding the branch to the dependency tree utilizing the received plurality of ruleset parameters.

\* \* \* \* \*